Patented Jan. 16, 1934

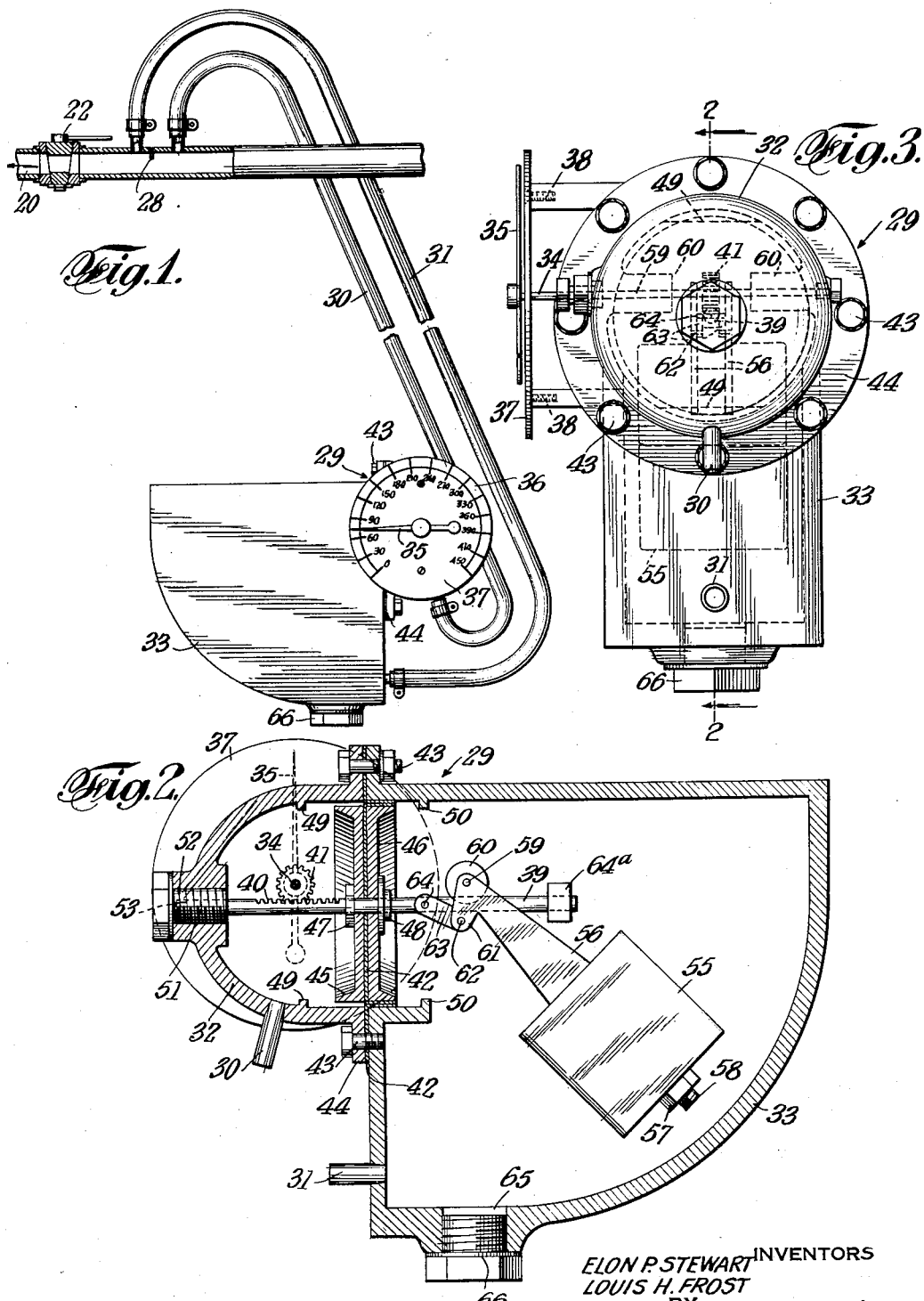

1,943,993

UNITED STATES PATENT OFFICE 1,943,993

DIFFERENTIAL METER

Elon P. Stewart, Syracuse, N. Y., and Louis H. Frost, Cleveland, Ohio, assignors to Cement-Gun Company, Inc., a corporation of New York Original application May 9, 1931, Serial No. 536,233. Divided and this application September 10, 1932. Serial No. 632,510

2 Claims. (Cl. 73—167)

The present invention relates to differential meters and more particularly to a differential meter or gauge adapted to be operated by the varying pressure drop produced by suitable means, such as a disk orifice, inserted in a flow stream of fluid, which may be air. This application is a division of our copending application Serial No. 536,233, filed May 9, 1931. An important object of the invention is to provide an improved meter or gauge of the general class specified. Another important object of the invention relates to the provision of an improved gauge in which an index is moved proportionally to changes in flow. One of the features of the invention relates to the provision of a connection whereby an index is moved substantially in accordance with the proper velocity square root function of the differences of pressure instead of movement directly in accordance with the differences in pressure. In other words, according to this feature equal changes of velocity in the flow stream produce equal changes in the movement of the index. Other features relate to various features of construction and arrangement.

In carrying out the invention in accordance with a preferred embodiment thereof, provision is made of a casing including a high pressure portion in the general form of a dome, connected at its substantially circular open end with a low pressure portion having a corresponding open end. The plane of said openings is preferably vertical and the low pressure part of the casing is arranged with a vertical wall extending downwardly from said opening therein and a wall arranged in the arc of a circle from the lower part of said vertical wall to the top of the casing, in order to accommodate a weighted arm swinging about a fixed pivot in this casing section. Preferably the weighted arm is provided at a point below its pivot and in such angular relation with the axis of the weighted arm that when connected by a link of suitable length with a reciprocating rod secured in a piston or the like between said chambers, the movement of the rod by differential pressures in the two sections of the casing will cause the rod to move approximately in accordance with the velocity square root function of the differences in pressure. Preferably also, the end of the rod in the high pressure chamber is guided in an opening in a screw plug extending through the casing and also serving as a stop for the reciprocating rod. Preferably also the effective length of the weighted arm may be varied.

Other objects and advantages will appear upon consideration of the following description and of the drawing, in which Fig. 1 illustrates the differential meter in elevation, showing it connected to a pipe containing a pressure difference producing aperture;

Fig. 2 is a section taken on the line 2—2 of Fig. 3, and

Fig. 3 is an elevation of the measuring device, viewed from the right in Fig. 1.

Referring to the drawings, a pipe or hose 20 is provided with a valve 22 to control the passage of fluid therethrough, and with a suitable orifice in the form of a thin segmental plate 28 projecting into the pipe. The flow of fluid, such as air, past the segmental orifice creates a differential pressure between the spaces at opposite sides of the orifice. This differential pressure bears a fixed relation to the quantity of air, or other fluid, passing through the orifice.

This difference in pressure is utilized to operate a suitable instrument or meter 29 which is connected by suitable ducts 30 and 31 with the pipe 20 at the high pressure and low pressure sides respectively of the segmental orifice formed at the segmental plate 28. The duct 30, which may be in the form of a flexible hose, is connected with a section or portion 32 of the device 29 so as to communicate with the interior thereof, and the duct 31, which also may be in the form of a flexible hose or tube, is connected with the interior of a casing member 33 also forming a part of the device 29.

The portion 32 of the casing 39 may be in the general form of a dome connected at its substantially circular open end with a corresponding opening in the casing member 33. Projecting through the dome-like portion 32 and parallel to the plane of division of the casing members 32 and 33, is a shaft 34 carrying at one end an index or pointer 35 to cooperate with a suitably calibrated scale 36 on a member or disc 37 through which the shaft 34 passes. Leakage of air where the shaft 34 projects from the casing may be prevented in any suitable manner. The disc 37 may be supported from the main body of the device 29 in any suitable manner as by means of bars 38 (Fig. 3). To operate the pointer 35 use is made of a rod 39 mounted for reciprocation axially of the dome-like member 32. At one side the rod 39 is provided with teeth 40 forming a rack to cooperate with the pinion 41 mounted on the shaft 34 which carries the index 35.

The rod 39 is moved longitudinally by differences in pressure at the interior of the casing members or sections 32 and 33 and to this end passes centrally through a diaphragm 42 of suitable material, such as rubber, clamped between adjacent portions of the casing members 32 and 33 by suitable means including bolts 43 passing through a flange 44 on the dome-like member 32 and corresponding portions of the casing member 33. The diaphragm 42 is supported at opposite sides by the pistons or piston members 45 and 46 which fit loosely enough in the opening between the casing sections to permit the rubber diaphragm to fold between the piston members and adjacent walls of the two casing members 32 and 33. The piston members 45 and 46 are held in position on the rod 39 by any suitable means such as members 47 and 48 fixed on the rod 39. On opposite sides of the diaphragm 42 the casing members 32 and 33 are provided with stops 49 and 50, respectively, preferably in the form of rings.

At the center of the dome-like member 32 it is provided with a bore 51 into which is threaded a screw plug 52 provided at its interior with a bore 53 which extends to its inner end and receives the corresponding end of the rod 39 for guiding purposes. The inner end of the bore 53 may also serve as a stop to limit the movement of the rod 39 in that direction under urging of the weight 55 removably and adjustably secured on arms 56 by means including a nut 57 screwed on a projection 58 connected with said arms 56. The arms 56 are on the opposite sides of the rod 39 and are pivoted on a shaft 59 above the rod 39 and mounted in bearings 60 projecting inwardly from opposite sides of the casing member 33. Each arm 56 is flat and in the form of a bent lever having a portion 61 extending below the rod 39 and pivoted at 62 to a link 63 which in turn is pivoted at 64 to the rod 39. By inspection of Figs. 1 and 3, it will be seen that the weight 55 tends to turn the pointer 35 back to the zero reading where the rod 39 may be stopped by engagement with the bottom of the bore 53 in the screw plug 52. Preferably the casing section 33 is shaped to correspond with the swinging movement of the weight 55 on the arms 56. In its reciprocation the rod 39 is guided at one end in the screw plug 52 and at its other end in the bearing 64a.

At its lower part the casing section 33 may be provided with a bore 65 normally closed by a screw plug 66 to enable adjustment of the weight 55 by means of the nut, the arrangement being such that the weight 55 may assume a position with the nut 57 immediately above the bore 65.

If the valve 22 in the air line 20 is closed, there will be no flow of air through the pipe and consequently no differences in pressure at opposite sides of the plate 28. Under these conditions the weight will swing downwardly to bring the nut 57 immediately above the bore 65, the exact position being determined by engagement of the left end of the rod 39 (Fig. 2) with the end of the bore in the screw plug 52. At this time the pointer 35 should be positioned at the zero indication of the scale 36. At the time that the piston member 45 is in engagement with the stop ring 49, the portion of the diaphragm 42 extending from the piston members 45 and 46 to the diaphragm clamping portions of the casing sections 32 and 33 will be straightened out and stretched to its limit. Upon opening the valve 22 the air will begin to flow through the supply pipe 20 and there will be differences of pressure at the opposite sides of the thin plate 28 at the measuring aperture. The pressure transmitted through the line 30 will be greater than that transmitted through the line 31 and consequently the piston members 45 and 46 will be forced to the right against the action of the weight 55 thus causing the pointer 35 to move away from the zero reading of the scale 36. If the differences in pressure are sufficiently great, the rod 39 will be forced to the right (Fig. 2) until the right hand piston member 46 comes into engagement with the stop or stop ring 50.

The difference in pressures at opposite sides of the thin plate orifice bears a fixed relation to the quantity of air passing through the orifice. The quantity of air passing through the orifice is directly related to the velocity of the air current and the difference in pressure is such a function of the velocity that uniform changes of velocity would cause changes of pressure differences which were not uniform. However, the link motion between the weight 55 and the reciprocating rod 39 is so designed as to transform square root velocity relation which would ordinarily produce unequal divisions of the scale, substantially into graduations of uniform length, as illustrated in Fig. 1. Such designing may be worked out in any suitable manner, as for example, by the use of graphic methods. As used in said copending application the scale 36 on the disk 37 was calibrated to read directly velocities at the nozzle of the "cement gun" or the like in suitable units, and if nozzles were changed, the scales were changed. When used for other purposes the scales may be calibrated to read directly velocities in the air duct or pipe 20.

It should be understood that the differential meter 29 is also adapted for use with flows, velocities and pressures encountered in use with Pitot measurements, rods and other flow measuring devices. For this use, however, the meter would preferably be larger than that required for use with the "cement gun".

It should be understood that the apparatus may be changed in various ways and that certain features may be used without others without departing from the true spirit and scope of the invention.

Having thus described our invention, we claim:—

1. In a device of the character described, two casings having vertically disposed circular openings adapted to register with each other and coaxial inner cylindrical surfaces extending away from the plane of said openings between said casings, each of said casings having an inlet to admit fluid thereto so that one casing is a higher pressure casing and the other casing is a lower pressure casing, a piston arranged to reciprocate within said cylindrical surfaces, an annular diaphragm extending from said piston and clamped between said casings at said circular openings, a substantially horizontal rod secured in said piston and projecting therefrom into and substantially across the higher pressure casing, means for urging the rod toward the side of the higher pressure casing away from the lower pressure casing, including in the lower pressure casing a weighted lever pivoted above said rod and a link pivoted to said rod and to said lever beneath the pivot of the lever, means in the higher pressure casing for limiting the movement of the end of the rod in the higher pressure chamber and indicating means having a rack and pinion connection with said rod.

2. In a device of the character described, two casings having a substantially horizontally disposed passage therebetween and each of said casings having an inlet to admit fluid thereto so that one of said casings is a higher pressure casing and the other is a lower pressure casing, a substantially vertically disposed diaphragm device extending across said passage, a substantially horizontally disposed rod connected with said diaphragm device and extending into both of said chambers, indicating means connected with said rod to move directly in accordance therewith, a weighted arm in the low pressure chamber pivoted above said rod and a link pivoted to said rod and to said lever beneath the pivot of the arm.

ELON P. STEWART.
LOUIS H. FROST.